United States Patent Office 3,796,704
Patented Mar. 12, 1974

3,796,704
PHENYL-IMIDAZOLYLALKANYL
DERIVATIVES
Carl Metzger, Werner Meiser, Karl Heinz Buchel, and
Manfred Plempel, Wuppertal-Elberfeld, Germany, assignors to Bayer Aktiengesellschaft, Leverkusen, Germany
No Drawing. Filed Aug. 16, 1971, Ser. No. 172,201
Claims priority, application Germany, Aug. 22, 1970,
P 20 41 771.4
Int. Cl. C07d 49/36
U.S. Cl. 260—240 K          32 Claims

ABSTRACT OF THE DISCLOSURE

Phenyl-imidazolylalkanyl derivatives are antimycotic agents. They are prepared by a number of processes including acylation or sulfonylation of a phenyl-imidazolylalkanol, treatment of a phenyl-alkanyl-carbinol with a diimidazolyl sulfone, oxidation of a phenyl-imidazolylalkylmercaptan or reduction of a phenyl-imidazolylalkanote or alkanonitrile. A typical embodiment is 1-(1,1-diphenyl-2-acetoxyethyl)imidazole.

DETAILED DESCRIPTION

The present invention relates to new phenyl-imidazolylalkanyl derivatives and their salts, to processes for their production, and to their pharmaceutical use, especially as antimycotics.

The present invention provides phenyl-imidazolyl-alkanyl derivatives of the general formula:

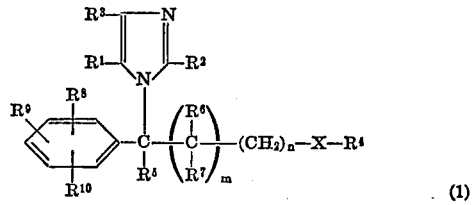

(1)

in which each of $R^1$, $R^2$, and $R^3$, independent of the other, is hydrogen or lower alkyl, $R^4$ is hydrogen; optionally substituted alkyl, alkenyl, alkynyl, aryl, aralkyl, aralkenyl, aralkynyl, aliphatic acyl, aromatic acyl, —$R^{4'}$—O—$R^{4'''}$, where $R^{4'}$ and $R^{4'''}$ are saturated or unsaturated hydrocarbon groups, alkyl-, alkenyl- or alkynyl-sulfonyl or arylsulfonyl, or a group of the formula:

(2)

in which:

Y is an oxygen (—O—) or sulphur (—S—);
$R^{12}$ is an optionally substituted lower alkoxy, lower alkenyloxy, lower alkynyloxy, lower alkylmercapto, lower alkenylmercapto, lower alkynylmercapto, aryloxy, arylmercapto, amino, mono(lower alkyl-, lower alkenyl-, or lower alkynyl-) amino, di(lower alkyl-, lower alkenyl-, or lower alkynyl-)amino, monoarylamino, diarylamino; arylsulfonamido, or -N(lower alkyl)-CO—NH-lower alkyl;
$R^5$ is hydrogen, alkyl, alkenyl or alkynyl or an optionally substituted aryl radical;
each of $R^6$ and $R^7$, independent of the other, is hydrogen or optionally substituted alkyl, alkenyl, alkynyl or aryl radical;
each of $R^8$, $R^9$ and $R^{10}$, independent of the other is hydrogen, lower alkyl, lower alkenyl, lower alkynyl, lower alkoxy, lower alkylthio radical, or an electronegative group;
X is an oxygen or sulphur atom or a —SO—, $SO_2$—, —NH—, or >N—$R^{11}$ group, $R^{11}$ being hydrogen or lower alkyl, lower alkenyl or lower alkynyl;
$m$ is an integer from 1 to 6; and
$n$ is 0 or 1, and their salts.

The term "alkyl" when employed herein refers to a straight or branched chain monovalent hydrocarbon group of from 1 to 8 carbon atoms. "Alkenyl" refers to a similar monovalent hydrocarbon group having from 2 to 8 carbon atoms and a non-terminal carbon-carbon ethylenic unsaturated bond. "Alkynyl" similarly refers to a monovalent hydrocarbon group of from 2 to 8 carbon atoms having a nonterminal carbon-carbon acetylenic unsaturated bond. When qualified by the term "lower," these groups will have no more than 6 carbon atoms, i.e. from 1 to 6 carbon atoms in the case of lower alkyl and from 2 to 6 in the case of lower alkenyl and lower alkynyl. Derivative substituents such as alkoxy, lower alkyl, lower alkylthio and the like, insofar as the hydrocarbon portion is concerned, are similarly defined.

These new derivatives and their salts have good activity against human-, animal- and plant-pathogenic fungi and yeasts as well as against bacteria and protozoa such as Trypanosomae and Trichomonadae.

$R^1$, $R^2$ and $R^3$ are hydrogen or lower alkyl, the latter preferably containing 1 to 4 carbon atoms, especially methyl. Particular preference is given to $R^1$, $R^2$ and $R^3$ being hydrogen. $R^8$, $R^9$ and $R^{10}$ are lower alkyl, preferably methyl; lower alkenyl; lower alkynyl; lower alkoxy; lower alkylthio; each of the foregoing preferably containing 1 to 4 carbon atoms; hydrogen; or an electro-negative substituent such as fluoro, chloro, bromo and iodo, preferably chloro and bromo; nitro, trihalomethyl, preferably trifluoromethyl; cyano; lower alkylsulfinyl and lower alkylsulfonyl, as well as the corresponding lower alkenyl sulfinyl and lower alkylsulfonyl groups. Hydrogen, chloro and bromo are particularly preferred.

$R^5$ is alkyl of 1 to 8 carbon atoms, alkenyl or alkynyl of 2 to 8 carbon atoms preferably containing no more than 4 carbon atoms, or an aryl group containing 6 to 10 carbon atoms. The aryl group may be unsubstituted or substituted by one or more, preferably no more than two groups, which may be identical or different. These substituents are of the same scope as those set forth above for $R^8$, $R^9$ and $R^{10}$. The preferred aryl group is phenyl, unsubstituted or substituted by chloro or bromo. Unsubstituted phenyl is particularly preferred.

$R^6$ and $R^7$ are alkyl of 1 to 8 carbon atoms, alkenyl or alkynyl of 2 to 8 carbon atoms, or aryl of from 6 to 10 carbon atoms. The alkyl, alkenyl and alkynyl groups can contain one or more substituents, preferably no more than two, which may be identical or different. These substituents are of the same scope as set forth above for $R^8$, $R^9$ and $R^{10}$.

$R^4$ can be alkyl, alkenyl and alkynyl, preferably containing 1 to 6, especially 1 to 4, carbon atoms, which can be optionally substituted by one or more, preferably no more than two, of the substituents set forth above for $R^8$, $R^9$ and $R^{10}$.

$R^4$ can also be aryl, aralkyl, aralkenyl and aralkynyl, the aliphatic component of the latter three preferably containing no more than 4 carbon atoms, and the aryl component of aryl, aralkyl, aralkenyl and aralkynyl preferably containing 6 or 10 carbon atoms. These groups can be substituted by one or more groups, preferably no more than two, which may be identical or different. These groups are of the same scope as those set forth above for $R^8$, $R^9$ and $R^{10}$. The preferred aryl is phenyl which can be substituted by chloro, bromo or fluoro.

$R^4$ can also be a straight-chain or branched, saturated or unsaturated aliphatic acyl, generally containing 1 to 8, preferably 1 to 6, and especially 1 to 5, carbon atoms, which can be unsubstituted or substituted by one or more, preferably no more than two, halo atoms, preferably fluoro, chloro or bromo, especially chlorine or bromine, or by phenyl.

$R^4$ can also be an aromatic acyl preferably containing 6 or 10 carbon atoms in the aryl part which is unsubstituted or substituted by one or more, preferably no more than three groups, which are identical or different. These substituents are of the same scope as those set forth for $R^8$, $R^9$ and $R^{10}$. The preferred aromatic acyl is a phenylacyl radical, a phenylacyl radical substituted by one or more, preferably one to three of the substituents chloro, bromo, fluoro, methyl, methoxy and/or nitro, and naphthylacyl.

$R^4$ can also be alkylsulfonyl, alkenylsulfonyl or alkynylsulfonyl, or an ether of the general formula $$-R^{4'}-O-R^{4''}$$

in which $R^{4'}$ and $R^{4''}$ are straight-chain or branched, hydrocarbon groups of 1 to 8, preferably 1 to 6 and especially 1 to 4 carbon atoms, unsubstituted or substituted by no more than two substituents, which may be identical or different, of the scope set forth above for $R^8$, $R^9$ and $R^{10}$.

$R^4$ can also be an arylsulfonyl of from 6 to 10 carbon atoms in the aryl component, unsubstituted or substituted by one or more, preferably no more than two groups, which can be identical or different, of the scope set forth above for $R^8$, $R^9$ and $R^{10}$. The preferred arylsulfonyl is phenylsulfonyl, especially unsubstituted phenylsulfonyl and phenylsulfonyl substituted by chloro or bromo.

$R^{12}$ can be lower alkoxy, lower alkenyloxy, lower alkynyloxy, lower alkylthio, lower alkenylthio, lower alkynylthio, amino, mono-(lower alkyl, lower alkenyl or lower alkynyl)amino or di-(lower alkyl, lower alkenyl or lower alkynyl)amino. $R^{12}$ preferably contains no more than 4 carbon atoms in each hydrocarbon component, especially methyl and ethyl in the case of lower alkyl and two carbon units for the other hydrocarbon; the hydrocarbon component can be straight-chain or branched and unsubstituted or substituted by one or more substituents of the same scope as set forth above for $R^8$, $R^9$ and $R^{10}$. The lower alkyl of monoalkylamino in particular can be further substituted by a lower alkanoyloxy, preferably one containing no more than 5 carbon atoms, especially acetoxy and propionyloxy.

$R^{12}$ can also be aryloxy, arylthio, mono- or di-(aryl)-amino radicals, or arylsulfonamide, the aryl component containing 6 or 10, preferably 6 carbon atoms, in each aryl part and substituted by one or more, preferably no more than 2 substituents of the scope set forth above for $R^8$, $R^9$ and $R^{10}$. The preferred aryl is phenyl, either unsubstituted or substituted by one or two chloro, bromo, or methyl groups.

$R^{12}$ can also be the —N(lower alkyl)—CO—NH-lower alkyl group, the two alkyl groups may be identical or different and preferably containing from 1 to 4 carbon atoms, especially methyl or ethyl.

$R^{11}$ can be lower alkyl, lower alkenyl and lower alkynyl, preferably containing 1 to 4 carbon atoms, especially methyl or ethyl.

The preferred salts of the imidazolyl derivatives of the invention are those that are pharmaceutically tolerated. These salts are those with physiologically compatible acids, such as hydrohalic acids; e.g., hydrochloric acid or hydrobromic acid; phosphoric acid; mono and bifunctional carboxylic acids; and hydroxycarboxylic acids, such as acetic acid, maleic acid, succinic acid, fumaric acid, tartaric acid, citric acid, salicylic acid, sorbic acid, lactic acid, and 1,5-naphthalene-disulfonic acid.

A first preferred subclass of compounds falling within the class defined by Formula 1 are those of the formula:

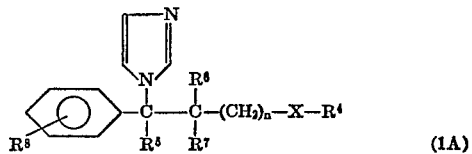

(1A)

wherein

X is oxygen; sulfur; imino; or sulfonyl;
$R^4$ is hydrogen; lower alkyl; phenyl or phenyl substituted by up to three substituents selected from the group consisting of lower alkyl, lower alkoxy, chloro, bromo, fluoro or nitro;
$R^5$ is lower alkyl or phenyl;
$R^6$ is hydrogen; lower alkyl or phenyl;
$R^7$ is hydrogen or lower alkyl;
$R^8$ is hydrogen, lower alkyl, lower alkoxy, chloro, fluoro, bromo or nitro, and
$n$ is 0 or 1.

A second preferred subclass of compounds falling within the class defined by Formula 1 are those of the formula:

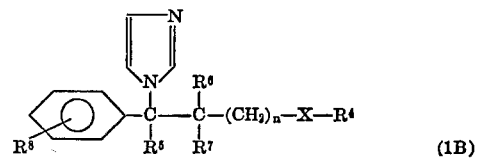

(1B)

wherein

X is oxygen or imino,
$R^4$ is lower alkanoyl, halo(lower alkanoyl), lower alkylsulfonyl, or a benzoyl, phenyl(lower alkanoyl), diphenyl(lower alkanoyl), phenyl(lower alkenoyl), naphthoyl or phenylsulfonyl group unsubstituted or substituted by up to three substituents selected from the group consisting of lower alkyl, lower alkoxy, chloro, bromo, fluoro or nitro;
$R^5$ is lower alkyl or phenyl;
$R^6$ is hydrogen; lower alkyl or phenyl;
$R^7$ is hydrogen or lower alkyl;
$R^8$ is hydrogen, lower alkyl, lower alkoxy, chloro, fluoro, bromo or nitro and
$n$ is 0 or 1.

A third preferred subclass of compounds falling within the class defined by Formula 1 are those of the formula:

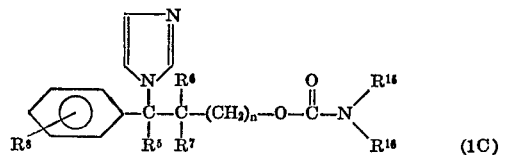

(1C)

wherein $R^5$ is lower alkyl or phenyl;
$R^6$ is hydrogen; lower alkyl or phenyl;
$R^7$ is hydrogen or lower alkyl;
$R^8$ is hydrogen; lower alkyl; lower alkoxy; chloro; fluoro; bromo or nitro;
$R^{15}$ is hydrogen or lower alkyl;
$R^{16}$ is hydrogen, lower alkyl, lower alkyl carbamyl, carbo(lower alkoxy)methylene, unsubstituted or substituted phenyl, or unsubstituted or substituted phenylsulfonyl, wherein the substituents on phenyl are one or two members selected from the group consisting of lower alkyl and chloro, and
$n$ is 0 or 1.

The invention further provides four processes for the production of the new imidazolyl derivatives and their salts. These processes are designated below as "Process 1" etc. Process 1 is applicable to those derivatives of Formula 1 and salts in which $n$ is 1 and X is oxygen (—O—)

or imino (—NH—). In this process a compound of the general formula:

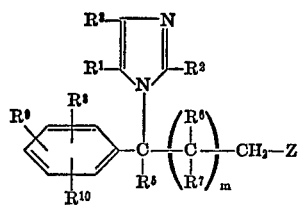

(3)

in which $R^1$ to $R^3$, $R^5$ to $R^{10}$ and $m$ are as defined for Formula 1 and Z is hydroxy or amino, is reacted with an acylating of sulfonylating agent, and if a salt is required, the product is converted to the desired salt.

Process 2 comprises reacting an alcohol of the general formula:

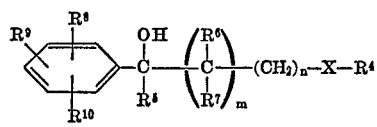

(4)

in which $R^4$ to $R^{10}$, X, $m$ and $n$ are as defined for Formula 1, with a compound of the general formula:

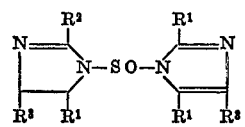

(5)

in which $R^1$ to $R^3$ are as defined for Formula 1 in an inert, preferably polar, solvent, and, if a salt is desired, converting the product to the said salt.

Process 3 is applicable to derivatives and salts in which X stands for the group —$SO_2$—. It comprises oxidizing a compound of the general formula:

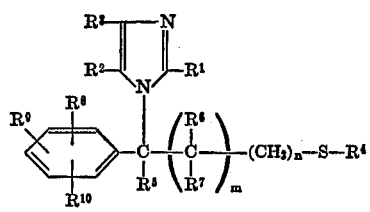

(6)

in which $R^1$ to $R^{10}$, $m$ and $n$ are as defined for Formula 1 in acid solution, and, if a salt is desired, converting the product to the said salt.

Process 4 is applicable to derivatives and salts in which $n$ is 1, X is oxygen (—O—) or imino (—NH—), and $R^4$ is hydrogen. It comprises reacting a compound of the general formula:

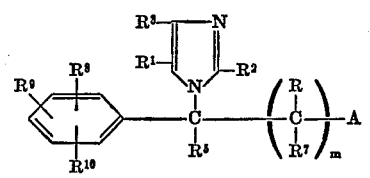

(7)

in which $R^1$ to $R^3$, $R^5$ to $R^{10}$ and $m$ are as defined above and A is carbo(lower)alkoxy or cyano with (preferably) an approximately stoichiometric amount of a complex metal hydride such as lithium aluminum hydride or sodium borohydride, in an organic solvent such as an ether (e.g. diethyl ether or tetrahydrofuran) or an alcohol (such as ethyl alcohol), if necessary decomposing by the addition of water the complex thus formed, and, if a salt is desired, converting the product to the said salt.

The course of the reaction according to Process 1 can be illustrated by the following Equation I, utilizing the carbinol shown below (8) and acetic anhydride as starting compounds:

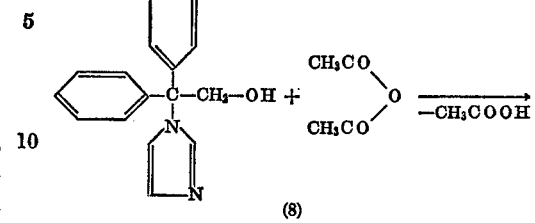

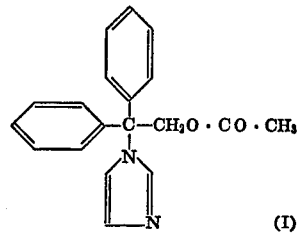

(I)

When the same carbinol (8) is used, but pivaloyl chloride is used as acrylating agent in the presence of a proton acceptor, triethylamine, then Process 1 is illustrated by the following equation:

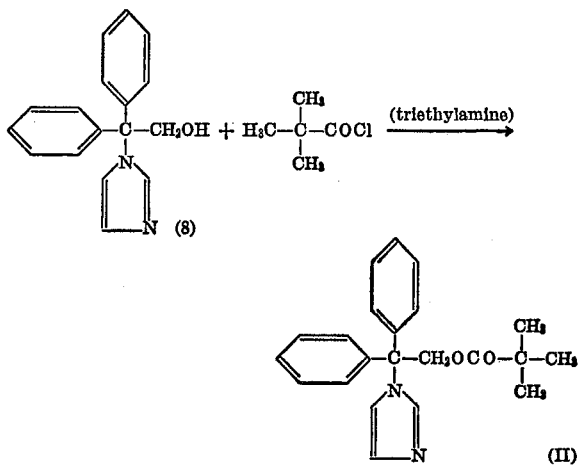

(II)

When the carbinol (8) and an isocyanate is used, e.g. p-chlorophenyl-isocyanate (9), then the course of the reaction according to Process 1 can be illustrated as follows:

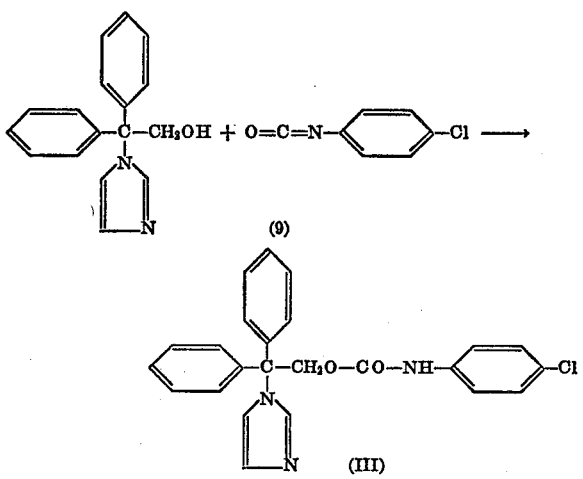

(III)

When the amine (10) and acetic anhydride are used as starting components, then the course of the reaction according to Process 1 can be illustrated by the following Equation IV:

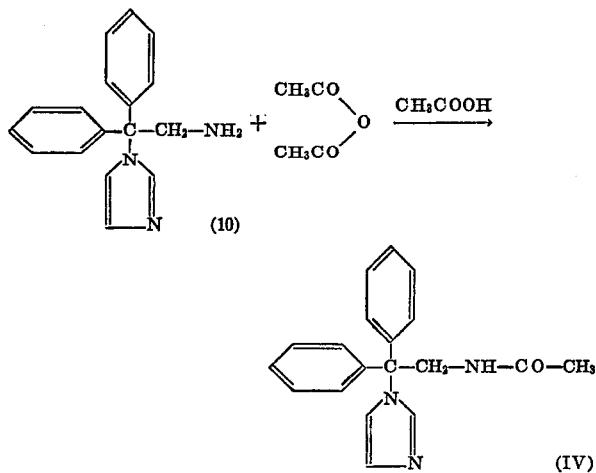

Process 2 can be illustrated by the following equation, utilizing the carbinol (11) and the compound (12) as starting compounds:

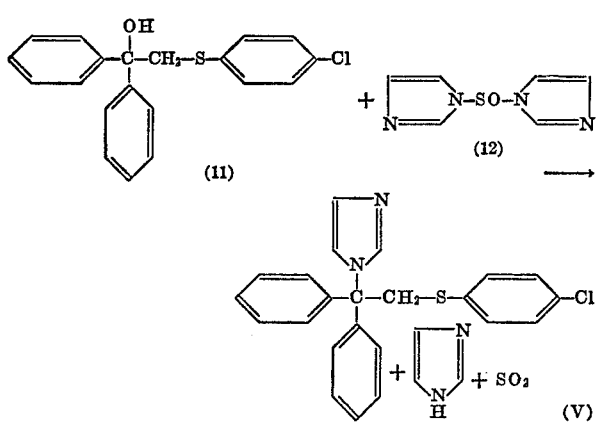

Process 3 can be illustrated by the following Equation VI:

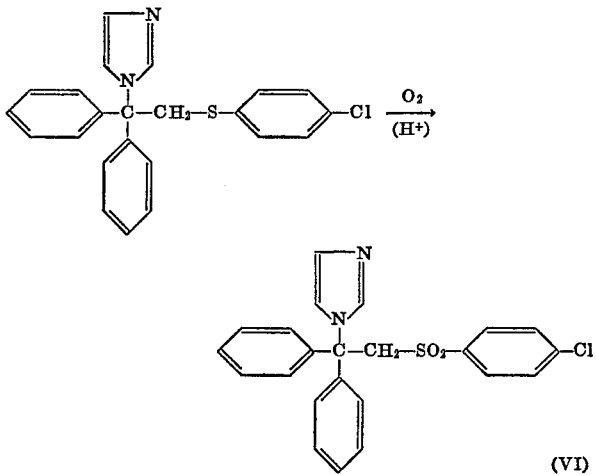

In Process 1 (acylation or sulfonylation), the reaction components are preferably used in approximately molar proportions, optionally with the addition of the approximately stoichiometric amount of an acid-binding base, e.g., a tert.alkylamine such as triethylamine. The acylation or sulfonylation according to Process 1 is preferably carried out using carboxylic acid or sulfonic acid halides, carboxylic acid or sulfonic acid anhydrides or isocyanates as acylating or sulfonylating agents respectively. The carboxylic acid and sulfonic acid halides used are preferably those of the Formula 13

$$R^4—Hal \qquad (13)$$

in which $R^4$ is an optionally substituted aliphatic or aromatic acyl or sulfonyl groups as defined above, or

where Y and $R^{12}$ are as defined above.

The carboxylic acid and sulfonic acid anhydrides used are preferably those of the Formula 14:

$$R^{13}—O—R^{13'} \qquad (14)$$

in which $R^{13}$ and $R^{13'}$ are identical or different and are optionally substituted aliphatic or aromatic acyl or sulfonyl groups, or the group

where Y and $R^{12}$ are as defined above.

The isocyanates used are preferably those of the general formula:

$$R^{14}—N=C=O \qquad (16)$$

in which $R^{14}$ is an optionally substituted alkyl, aryl or aralkyl group or a —CH$_2$—COO—(lower alkyl).

When an acid anhydride is employed, Process 1 can be carried out in the presence or the absence of an inert polar solvent.

When an acid chloride or isocyanate is employed, Process 1 is generally performed in an inert polar organic solvent, including ethers such as diethyl ether and tetrahydrofuran; aromatic solvents such as benzene and toluene; cycloaliphatic solvents such as cyclohexane; lower dialkyl ketones such as acetone; aliphatic esters such as ethyl acetate, or a tertiary amine such as pyridine. The process is performed at from about 20° C., preferably from about 50° C. to about 100° C.

Process 2 is performed in an inert organic solvent, preferably in approximately molar amounts.

Examples of suitable solvents include aromatic solvents such as benzene or toluene; lower dialkyl ethers such as diethyl ether; chlorinated hydrocarbons such as methylene chloride, chloroform or carbon tetrachloride; and lower alkyl nitriles such as acetonitrile. Acetonitrile is particularly preferred as solvent.

The reaction of Process 2 is carried out at temperatures of from about 0° to 120° C., preferably from about 20° C. to about 80° C.

In Process 3, the reaction components are preferably used in approximately molar amounts. The process is preferably conducted in an aqueous medium, examples of which include aqueous sulfuric acid containing, for example, 20% of sulfuric acid, and concentrated acetic acid. Suitable oxidizing agents include potassium permanganate, hydrogen peroxide and chromic acid. The oxidizing agents can be used in stoichiometric amounts or in excess. The reaction temperature is from about 0° to about 20° C., preferably from about 5° to about 10° C.

The salts can be prepared in known manner from the free derivatives of Formula 1, obtainable by the processes described above.

The starting compounds required for the production of the new compounds are either known or can be obtained by known processes.

Some of the new compounds according to the invention are listed by way of example in Table 1.

TABLE 1
Compounds of the general formula:
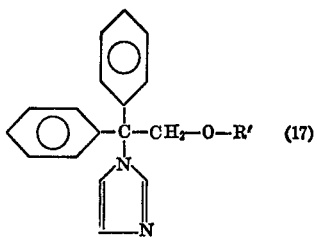
| Compound number | R' | | M.P., °C. |
|---|---|---|---|
| 1 | H | | 144 |
| 2 | Hydrochloride of 1 | | 192 |
| 3 | CH₃—CO— | | 83 |
| 4 | CH₃—CH₂—CO— | | 74 |
| 5 | (CH₃)₃C—CO— | | 117 |
| 6 | Cl₂CH—CO— | | 210 |
| 7 | C₆H₅—CO— | (18) | 129 |
| 8 | Cl—C₆H₄—CO— | (19) | 128 |
| 9 | 2-Cl—C₆H₄—CO— | (20) | 116 |
| 10 | 3,4-Cl₂—C₆H₃—CO— | (21) | 158 |
| 11 | 2,6-Cl₂—C₆H₃—CO— | (22) | 73 |
| 12 | 3,4,5-Cl₃—C₆H₂—CO— | (23) | 115 |
| 13 | F—C₆H₄—CO— | (24) | 122 |
| 14 | Br—C₆H₄—CO— | (25) | 118 |
| 15 | O₂N—C₆H₄—CO— | (26) | 135 |
| 16 | 2,4-(NO₂)₂—C₆H₃—CO— | (27) | 132 |
| 17 | 3-CH₃O-4-O₂N—C₆H₃—CO— | (28) | 114 |
| 18 | CH₃—C₆H₄—CO— | (29) | 134 |
| 19 | CH₃O—C₆H₄—CO— | (30) | 118 |
| 20 | C₆H₅—CH=CH—CO— | (31) | 87 |

TABLE 1—Continued
| Compound number | R' | | M.P., °C. |
|---|---|---|---|
| 21 | naphthyl-CO— (32) | | 150 |
| 22 | (C₆H₅)(C₆H₅)CH—CO— (33) | | 126 |
| 23 | Cl—C₆H₄—SO₂— (34) | | 121 |
| 24 | CH₃—SO₂— (35) | | 187 |
| 25 | CH₃—NHCO—N(CH₃)—CO— (36) | | 140 |
| 26 | (CH₃)₂N—CO— (hydrochloride) (37) | | 151 |
| 27 | C₂H₅OCO—CH₂—NH—CO— (38) | | 105 |
| 28 | Cl—C₆H₄—NH—CO— (39) | | 198 |
| 29 | (Cl)(Cl)C₆H₃—NHCO— (40) | | 218 |
| 30 | CH₃—C₆H₄—SO₂NH—CO— (41) | | 148 |
Compounds of the general formula:
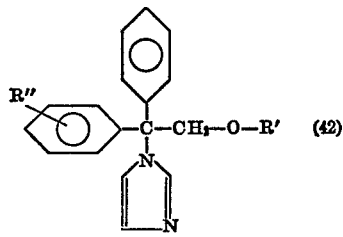
(42)
| Compound number | R' | | R'' | M.P., °C. |
|---|---|---|---|---|
| 31 | C₆H₅— (43) | | H | 142 |
| 32 | Cl—C₆H₄— (44) | | H | 141 |
| 35 | (Cl)C₆H₄— (45) | | H | 130 |
| 36 | C₆H₅— (43) | | p-Cl | 138 |
| 37 | (CH₃)₃C— (46) | | H | 128 |
| Compound number | Formula | M.P., °C. |
|---|---|---|
| 38 | 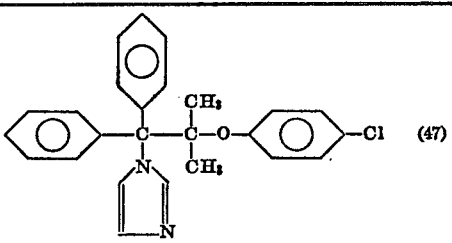 (47) | 148 |

TABLE 1—Continued

Compounds of the general formula:

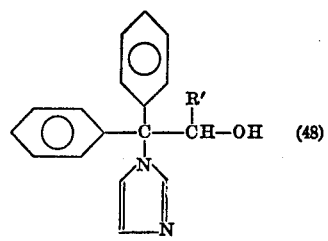 (48)

| Compound number | R' | M.P., °C. |
|---|---|---|
| 39 | CH₃ | 154 |
| 40 | (43) | 203 |

Compounds of the general formula:

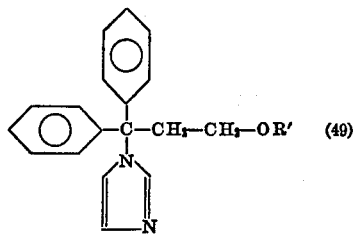 (49)

| Compound number | R' | M.P., °C. |
|---|---|---|
| 41 | H | 130 |
| 42 | CH₃—CO— | 80 |

Compounds of the general formula:

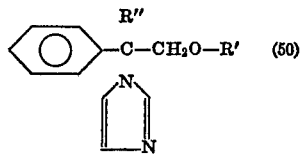 (50)

| Compound number | R' | R'' | M.P., °C. |
|---|---|---|---|
| 43 | H | $-\underset{\underset{CH_3}{\overset{CH_3}{|}}}{C}-CH_3$ (46) | 130 |
| 44 | CH₃—CO— | $-\underset{\underset{CH_3}{\overset{CH_3}{|}}}{C}-CH_3$ (46) | 70 |
| 45 | H | $-\underset{\overset{CH_3}{}}{\overset{CH_3}{CH}}$ (51) | 120 |
| 46 | CH₃—CH₂—CO— | $-\underset{\underset{CH_3}{\overset{CH_3}{|}}}{C}-CH_3$ (46) | 65 |
| 47 | | 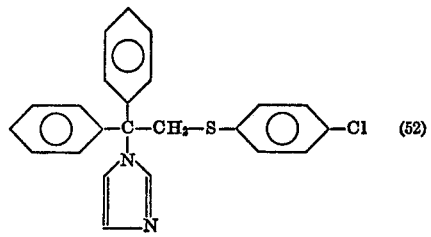 (52) | 126 |

TABLE 1—Continued

| Compound number | R' | R'' | M.P., °C. |
|---|---|---|---|

Compounds of the general formula:

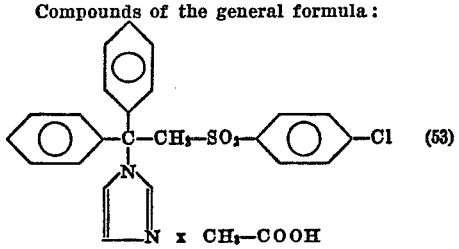

| 48 | | | 134 |

Compounds of the general formula:

$$\underset{\underset{N}{\overset{R''}{\underset{|}{\text{C}}}}{\bigcirc}}-CH_2-CH_2-OR' \quad (54)$$

| Compound number | R' | R'' | M.P., °C. |
|---|---|---|---|
| 49 | H | —CH(CH₃)(CH₃) (51) | |
| 50 | CH₃—CO— | —CH(CH₃)(CH₃) (5) | |

Compounds of the general formula:

$$\underset{\underset{N}{\bigcirc}}{\bigcirc}-\overset{\bigcirc}{\underset{|}{\text{C}}}-CH_2-NH-R' \quad (55)$$

| Compound number | Formula | M.P., °C. |
|---|---|---|
| 51 | R'=H | |
| 52 | R'=CH₃—CO— | 173 |
| 35 | | |

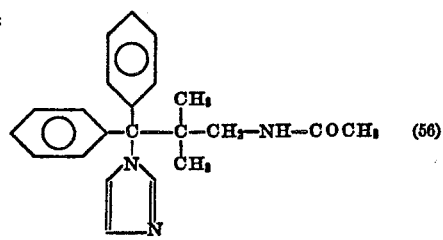

The production by the processes of the invention of certain derivatives and salts according to the invention is illustrated in the following examples.

EXAMPLE 1

A solution of 26.6 g. (0.0911 mol) diphenyl imidazolyl-acetic acid methyl ester in 300 ml. of absolute tetrahydrofuran is added dropwise at room temperature (about 20° C.) to a suspension of 3.5 g. (0.0911 mol) LiAlH₄ in 100 ml. of absolute tetrahydrofuran. After stirring at 25° C. for two hours, the mixture is slowly heated to 50° C. and the same temperature is subsequently maintained for 4 hours. The complex is decomposed at —10° C. with 10 g. of 20% aqueous NaOH. The hydroxides are filtered off with suction and boiled several times with benzene. The benzene and tetrahydrofuran solutions are combined and concentrated by evaporation. The residue is Compound No. 1 of the formula:

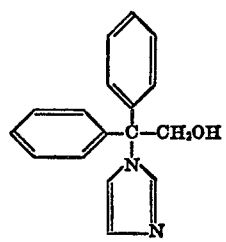

with a melting point of 144° C. (ethyl acetate); yield 16.5 g. (70% of theory).

Calcd. for $C_{17}H_{16}N_2O$ (264.3): N, 10.6%. Found: N, 10.7%.

When 10 g. of the base obtained in this way are dissolved in 100 ml. ethyl acetate, and ethereal hydrochloric acid is added with cooling, then the hydrochloride (Compound No. 2) slowly crystallizes.

M.P. 192° C.; yield 10.8 g. (96% of theory).

[C$_{17}$H$_{17}$N$_2$O]Cl (300.8).

The diphenyl-imidazolyl-acetic acid methyl ester required as starting material is obtained as follows:

13 g. (0.05 mol) diphenyl-chloroacetic acid methyl ester (B.P. 140° C./0.1 mm. Hg, prepared from diphenyl-α-chloroacetic acid chloride and methanol according to Ber. 2, 1537) are heated with 10 g. imidazole in 100 ml. acetonitrile at boiling temperature for 18 hours. After distilling off the solvent in a vacuum, 100 ml. of water are added, and the mixture is extracted with methylene chloride. After drying over sodium sulphate, the solvent is distilled off in a vacuum and the residue is recrystallized from a little ethyl acetate. The diphenyl-imidazolyl-acetic acid methyl ester of M.P. 155° C. (decomposition) is thus obtained.

The other starting compounds of this type can be obtained in an analogous way.

The Compounds Nos. 41, 43 and 45 listed in Table 1 can be obtained according to the process of Example 1 from the following starting materials:

| Starting material | Product |
|---|---|
| Diphenyl-(imidazolyl-1)-acetic acid methylester | Compound 41. |
| Tert.-butyl-phenyl-(imidazolyl-1)-acetic acid methylester. | Compound 43. |
| Isopropyl-phenyl-(imidazolyl-1)-acetic acid methylester. | Compound 45. |

EXAMPLE 2

5 g. (0.01895 mol) 1,1-diphenyl-1-imidazolyl-ethanol-2 are heated with 20 ml. acetic anhydride and 0.5 g. of anhydrous sodium acetate at 100° C. for 2 hours. After cooling, the mixture is poured into 200 ml. of water and stirred until the acetic anhydride odor disappears. The mixture is then clarified with animal charcoal, rendered alkaline, and extracted with ether. After evaporation of the ether, there remains Compound No. 3 of the formula:

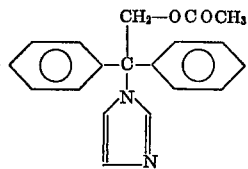

(57)

with a melting point of 83° C. (ligroin/ethyl acetate); yield 2.9 g. (50% of theory).

Calcd. for C$_{19}$H$_{18}$N$_2$O$_2$ (306.4) (percent): C, 74.4; H, 5.9; N, 9.16. Found (percent): C, 74.0; H, 6.0; N, 9.18.

The Compounds Nos. 4, 6, 42, 44 and 46 listed in Table 1 can be obtained according to the process of Example 2 from the following starting materials:

| Starting material | Product |
|---|---|
| 1,1-diphenyl-1-imidazolyl-ethanol-2, propionic anhydride and sodium propionate. | Compound 4. |
| 1,1-diphenyl-1-imidazolyl-ethanol-2, dichloroacetic-acid-anhydride and sodium dichloroacetate. | Compound 6. |
| 1,1-diphenyl-1-imidazolyl-propanol-3, acetic acid anhydride, butanol-4 and sodium acetate. | Compound 42. |
| 2,2-dimethyl-3-phenyl-3-imidazolyl, acetic acid anhydride butanol-4 and sodium acetate. | Compound 44. |
| 2,2-dimethyl-3-phenyl-3-imidazolyl-tritanol-4, propionic anhydride and sodium propionate. | Compound 46. |

EXAMPLE 3

5.28 g. (0.02 mol) 1,1-diphenyl-imidazolyl-ethanol-2 are dissolved in 16 ml. pyridine. 3.5 g. 4-chloro-benzoyl chloride (0.02 mol) are slowly added dropwise; the temperature must remain below 20° C. After stirring overnight, the mixture is poured into 160 ml. of ice water, the product is filtered off with suction and thoroughly washed with water. Compound No. 8 obtained in this way corresponds to the formula

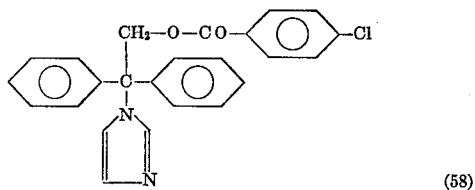

(58)

and has a M.P. of 128° C. (methanol); yield 6.3 g. (78% of theory).

Calcd. for C$_{24}$H$_{19}$ClN$_2$O$_2$ (402.5): N, 6.95%. Found N, 6.78%.

The Compounds Nos. 7, 9, 10, 11, 12, 13, 14, 15, 16, 17, 18, 19, 20, 21, 22 and 23 listed in Table 1 can be obtained according to the process of Example 3 from 1,1-diphenyl-1-imidazolyl-ethanol-2 and the following acid chlorides:

| Acid chloride | Product |
|---|---|
| Benzoyl chloride | Compound 7. |
| 2-chlorobenzoyl chloride | Compound 9. |
| 3,4-dichlorobenzoyl chloride | Compound 10. |
| 2,6-dichlorobenzoyl chloride | Compound 11. |
| 2,3,4-trichlorobenzoyl chloride | Compound 12. |
| 4-fluorobenzoyl chloride | Compound 13. |
| 4-bromobenzoyl chloride | Compound 14. |
| 4-nitrobenzoyl chloride | Compound 15. |
| 3,5-dinitrobenzoyl chloride | Compound 16. |
| 3-nitro-4-methoxybenzoyl chloride | Compound 17. |
| 4-methylbenzoyl chloride | Compound 18. |
| 4-methoxybenzoyl chloride | Compound 19. |
| Cinnamoyl chloride | Compound 20. |
| α-Naphthoyl chloride | Compound 21. |
| Diphenylacetyl chloride | Compound 22. |
| 4-chlorophenylsulfonyl chloride | Compound 23. |

EXAMPLE 4

5.28 g. (0.02 mol) 1,1-diphenyl-1-imidazolyl-ethanol-2 are dissolved in 16 ml. pyridine. 4 g. methane-sulfochloride are added dropwise in such a manner that the temperature always remains below 20° C. After stirring overnight, the mixture is poured into 160 ml. of ice-water. The product is filtered off with suction and thoroughly washed. Compound No. 24 obtained in this way corresponds to the formula

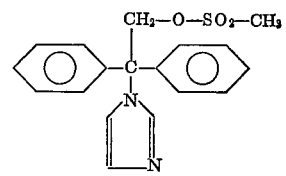

(59)

and has a M.P. of 187° C. (ethanol); yield 5.7 g. (83% of theory).

Calcd. for C$_{18}$H$_{18}$N$_2$O$_3$S (342.0) (percent): C, 63.1; H, 5.26; N, 8.18. Found (percent): C, 63.1; H, 5.1; N, 8.1.

EXAMPLE 5

5.28 g. (0.02 mol) 1,1-diphenyl-imidazolyl-ethanol-2 are dissolved in 16 ml. pyridine. 3 g. dimethyl-carbamic acid chloride are added dropwise in such a manner that the temperature always remains below 20° C. After stirring overnight, the mixture is poured into 160 ml. of ice-water.

The aqueous solution is saturated with sodium chloride, whereupon crystallization sets in. The crystals are filtered off with suction and pressed off. After drying, they are boiled with 100 ml. of absolute ethanol, the sodium chloride is filtered off, and the solvent of the filtrate is distilled off in a vacuum. After digesting with absolute ether, the hydrochloride (No. 26) of the compound of the formula

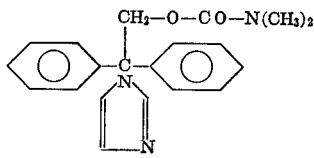

(60)

19 crystallizes out; M.P. 151° C. (ether); yield 6.35 g. (85% of theory).

Calcd. for [C26H22N3O2]Cl (371.5): N, 11.3%. Found: N, 11.1%.

EXAMPLE 6

5.28 g. (0.02 mol) 1,1-diphenyl-1-imidazolyl-ethanol-2 are dissolved in 40 ml. ethylene chloride, and 3.3 g. isocyanate-acetic acid ethyl ester and 3 drops of triethylamine are added. After standing for 3 days, the mixture is distilled in a vacuum, the residue is boiled with absolute ether, whereupon crystallization sets in. Compound No. 27 obtained in this way corresponds to the formula

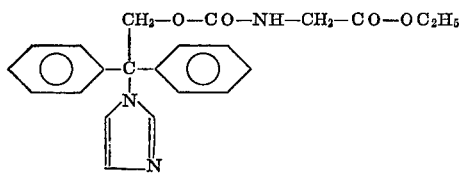

(61)

and has a M.P. of 105° C. (ether); yield 5.7 g. (73% of theory).

Calcd. for $C_{22}H_{23}N_3O_4$ (393) (percent): C, 67.2; H, 5.85; N, 10.7. Found (percent): C, 66.3; H, 6.0; N, 10.7.

The Compounds Nos. 25, 28, 29 and 30 listed in Table 1 can be obtained according to the process of Example 6 from 1,1-diphenyl-1-imidazolyl-ethanol-1 and the following reagents:

| Reagent | Product |
| --- | --- |
| Methylisocyanate | Compound 25. |
| 4-chlorophenylisocyanate | Compound 28. |
| 3,4-di-chlorophenylisocyanate | Compound 29. |
| p-Toluolsulfoisocyanate | Compound 30. |

EXAMPLE 7

52.5 (0.2 mol) phenyl-4-chlorophenyl-thiomethylketone (prepared from 4-chloro-thiophenol and α-chloroacetophenone) in 400 ml. of absolute ether and 100 ml. benzene are added dropwise to a Grignard solution of 5 g. magnesium and 38.8 g. bromobenzene in 200 ml. of absolute ether. When the exothermic reaction has subsided, the solution is decanted from the small residue and the ether is distilled off in a vacuum. The residue is decomposed with ice-water and dilute sulfuric acid and extracted with methylene chloride. After washing with water, the product is dried and the solvent distilled off in a vacuum. When the residue is digested with absolute ether, there is obtained some starting material of M.P. 80° C., which is filtered off with suction. The filtrate is distilled off in a vacuum. The compound obtained in this way corresponds to the formula

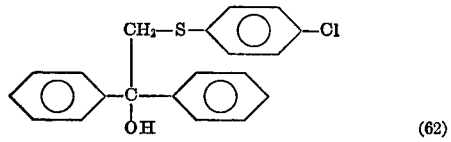

(62)

and has a M.P. of 55° C. (ligroin); yield 30 g. (44% of theory).

Calcd. for $C_{20}H_{17}ClOS$ (340.5): Cl, 10.42%. Found: Cl, 11.15%.

The alcohols suitable for the preparation of the Compounds Nos. 31, 32, 35, 36, 37 and 38 listed in Table 1 as well as all other alcohols of this type which can be used according to the invention are obtainable in an analogous way.

Compound No. in Table 1: Melting point of alcohol suitable as starting compound (° C.)

- 32 ----- 88
- 35 ----- 107
- 36 ----- 51
- 38 ----- 99

20

EXAMPLE 8

11.1 g. (0.093 mol) SOCl2 are slowly added dropwise at 0 to 5° C. to a solution of 27.8 g. (0.409 mol) of purified imidazole in 500 ml. of absolute acetonitrile. After stirring at 0° C. for 30 minutes, the imidazole·HCl is filtered off with suction. 29.2 g. (0.086 mol) S-(p-chlorophenyl)-1,1-diphenyl-mercaptoethanol-1 (Example 7) dissolved in 100 ml. of absolute acetonitrile are added to the filtrate, and the mixture is heated at 35 to 40° C. for 4 hours, subsequently at 60° C. for 30 minutes, at 70° C. for 20 minutes, and under reflux for one hour. After evaporation of the solvent, 400 ml. ether and 300 ml. H2O are added to the residue. The ether solution is separated, washed several times with water, dried, and ether·HCl is added until the reaction is acidic. The precipitated hydrochloride is dissolved in H2O, the solution is clarified with animal charcoal, rendered alkaline, and extracted with ether. After evaporation of the ether, there remains Compound No. 47 of the formula

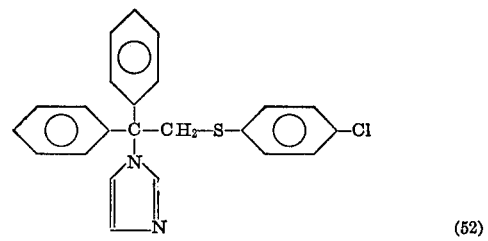

(52)

which has a melting point of 126° C. (ethyl acetate); yield 9.5 g. (27% of theory).

Calcd. for $C_{23}H_{19}ClN_2S$ (390.9) (percent): C, 70.6; H, 4.86; Cl, 9.09; N, 7.16; S, 8.19. Found (percent): C, 70.2; H, 4.76; Cl, 9.02; N, 7.17; S, 8.24.

The Compounds Nos. 31, 32, 35, 36, 37 and 38 listed in Table 1 can be obtained according to the process of Example 8 from diimidazolyl sulfone and the following alcohols:

| Alcohol | Product |
| --- | --- |
| O-phenyl-1,1-diphenyl-glycol | Compound 31. |
| O-(p-chlorophenyl)-1,1-diphenyl-glycol | Compound 32. |
| O-(2-chlorophenyl)-1,1-diphenyl-glycol | Compound 35. |
| O-phenyl-1-phenyl-1-(4-chlorophenyl)-glycol | Compound 36. |
| O-tert.-butyl-1,1-diphenyl-glycol | Compound 37. |
| O-(p-chlorophenyl)-2,2-dimethyl-1,1-diphenylglycol | Compound 38. |

EXAMPLE 9

50 ml. of 20% H2SO4 are added to a solution of 5 g. (0.0128 mol) 1-(p-chlorophenyl)-mercapto)-2,2-diphenyl-2-imidazolylethane in 100 ml. of purified glacial acetic acid; a saturated aqueous solution of KMnO4 is slowly added dropwise with cooling, until a permanent red coloration occurs. The mixture is decolorized with a solution of NaHSO3, rendered alkaline with NaOH at 10° C., and extracted with CH2Cl2. After evaporation of the solvent, there remains Compound No. 48 of the formula:

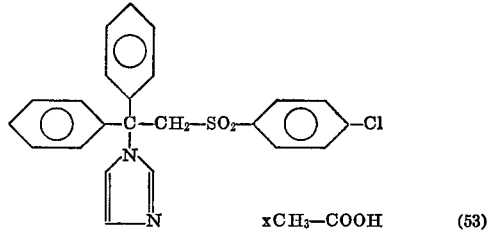

xCH3—COOH (53)

which has a melting point of 134° C. (ethyl acetate); yield 0.7 g. (8% of theory).

Calcd. for $C_{23}H_{19}ClN_2O_2S \cdot xCH_2COOH$ (466.0) (percent): Cl, 7.39; N, 5.82. Found (percent): Cl, 7.75; N, 5.79.

EXAMPLE 10

12.05 g. (0.1 mol) pivaloyl chloride are added dropwise at 20 to 25° C. to a solution of 20 g. (0.076 mol)

1,1-diphenyl-1-imidazolyl-ethanol-2 and 10.1 g. (0.1 mol) triethylamine in 700 ml. of absolute acetonitrile. The mixture is subsequently stirred at room temperature (about 20° C.) for one hour and then strongly cooled. The crystallized triethylamine hydrochloride is filtered off with suction and the filtrate evaporated. The residue is taken up in 200 ml. methylene chloride, washed with water, dried and concentrated by evaporation. The residue crystallizes when triturated with petroleum ether to which some ethyl acetate has been added. Compound No. 5 obtained in this way corresponds to the formula:

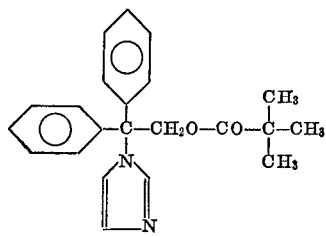

(63)

and has a M.P. of 117° C.; yield 52% of theory.

EXAMPLE 11

25.9 g. (0.1 mol) diphenyl-imidazolyl-acetonitrile in 200 ml. of absolute ether are slowly added dropwise at room temperature (about 20° C.) to a suspension of 2.7 g. (0.07 mol) LiAlH$_4$ in 100 ml. of absolute ether. The mixture is subsequently stirred at room temperature (about 20° C.) for 2 hours and then heated under reflux for 4 hours. The complex is decomposed at −10° C. by the addition of 8 g. of aqueous NaOH. The metal hydroxides are filtered off with suction and boiled several times with benzene. The ether solution and the benzene extracts are combined and completely concentrated by evaporation. The N-(2,2-diphenyl-2-imidazolyl)-ethylamine remains as an oil which crystallizes with absolute ether.

To prepare the compound mentioned above, the amine is mixed with twice its weight of acetic anhydride and, when the reaction has subsided, heated on a boiling water bath for 30 minutes. By pouring ice-water into the mixture, Compound No. 52 of the formula

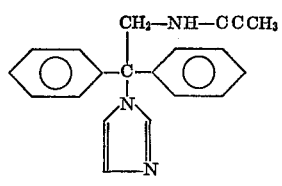

(63)

is obtained as an oil which is extracted with methylene chloride and, after drying of the solution and evaporation, is precipitated in crystalline form. For purification, it is recrystallized from ethyl acetate; M.P. 173° C.

The diphenyl-imidazolyl-acetonitrile required as starting material is obtained as follows:

100 g. diphenyl-α-chloroacetic acid amide (according to Ber. 22, 1539) are heated with 200 g. phosphorus oxychloride at 110° C. for 3 hours. The phosphorus oxychloride is distilled off in a vacuum. The residue is digested several times with methylene chloride, the methylene chloride is shaken with ice-water, dried and distilled. 70 g. diphenyl-α-chloracetonitrile of B.P. 130° C./0.4 mm. Hg are obtained. 59 g. of this nitrile are heated with 50 g. imidazole in 500 cc. acetonitrile at boiling temperature for 18 hours. After distilling off the solvent in a vacuum, 300 ml. of water are added and the mixture is extracted with methylene chloride. After drying, the methylene chloride is distilled off in a vacuum and the residue is recrystallized from ethyl acetate/ligroin.

About 53 g. diphenyl-imidazolyl-acetonitrile of M.P. 100° C. are obtained in this way.

The other starting compounds of this type which can be used according to the invention are obtainable in an analogous way.

EXAMPLE 12

13.3 g. (0.05 mol) 1,1-diphenyl-1-(imidazolyl)-propanone-2 are suspended in 50 ml. ethanol, and 1.0 g. sodium boron hydride (about 0.03 mol) are added at 0 to 5° C. The mixture is stirred for 2 hours while cooling with ice, and allowed to stand overnight. 100 ml. of water are then added, the pH is adjusted to 6–7 with acetic acid, the product is filtered off with suction, washed with water and dried.

In this way there are obtained 12.3 g. of Compound No. 39 of the formula

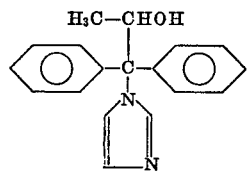

(64)

in the form of colorless crystals; M.P. 154° C.; yield 12.3 g. (96% of theory).

EXAMPLE 13

17.4 g. (0.05 mol) diphenyl-benzoyl-(imidazol-1-yl)-methane are dissolved in 100 ml. tetrahydrofuran and 50 ml. ethanol, and 1.0 g. sodium boron hydride is added at 0 to 5° C. The product begins to crystallize after 1 to 2 hours, the mixture is diluted with ice-water, and the crystals are filtered off with suction. The Compound No. 40 obtained in this way corresponds to the formula

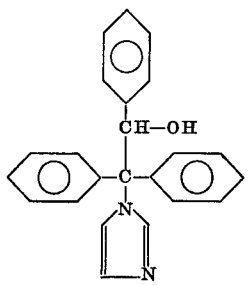

(65)

and has a M.P. of 203° C. (dimethyl formamide/water); yield 16.3 g. (93% of theory).

As has already been mentioned, the compounds according to the invention and their salts have an excellent antimycotic activity. This can be seen from the following tests carried out in vivo and in vitro:

Microbiological activity of the preparations (1) In vitro effect and type of activity against various human- and animal-pathogenic fungi: The above preparations exhibit in vitro a good and wide ranging activity against human- and animal-pathogenic fungi. The minimal inhibition concentrations (MIC) of some preparations against several species of fungi are indicated in Table 2 by way of example.

The nutrient media for the tests in vitro were:

(a) for dermatophytes and mould fungi: Sabouraud's milieu d'enreuve;
(b) for gemmiparous fungi and biphasic fungi: meat broth/glucose broth.

The incubation temperature was 28° C., the incubation period 48–96 hours.

TABLE 2

Determination of MIC against various species of fungi in the serial dilution test and agar diffusion test

| Compound from Table 1 Number: | MIC in /ml. substrate | | | | |
|---|---|---|---|---|---|
| | Trichophytonmentagrophytes | Candida albicans | Microsporon canis | Aspergillus niger | Penicillium commune |
| 4 | 4 | 1 | 4 | 10 | 1 |
| 5 | 4 | 1 | 1 | 20 | 1 |
| 6 | 10 | 10 | 40 | 40 | 40 |
| 8 | 4 | 1 | 4 | 100 | 100 |
| 16 | 4 | 40 | 4 | 40 | 100 |
| 40 | 10 | 4 | 4 | 10 | 40 |
| 9 | <1 | 1 | <1 | 10 | 40 |
| 47 | <1 | 1 | <1 | 1 | <1 |

The effect of the preparations is primarily fungistatic; fungicidal effects can be achieved in vitro with about three times the minimal inhibition concentrations.

A striking feature is the broad antimycotic effect of the aforesaid preparations, which extends to dermatophytes and mould fungi as well as to gemmiparous fungi, e.g. yeasts of the species Candida.

(2) Antimycotic effect of the preparations in vivo.—
(a) Experimental candidosis: Male mice (strain $CF_1$-SPF) of 20–22 g. weight are intravenously infected with $1 \times 10^6$ cells of a *Candida albicans* culture. Untreated mice die, on average, after 4–6 days post infectionem from the organocandidosis developing after the infection. When the above preparations, especially the Compounds Nos. 4, 5, 6, 8, 9, 16, 40, 47 listed in Table 1 are administered to Candida-infected mice per os with a throat probe twice daily in doses of 50–100 mg. per kg. body weight, starting on the day of infection, then >90% of the animals survive the 6th day post infectionem, whereas only 5–10% of the untreated control animals survive the same period of time.

(b) Experimental trichophytia of the mouse caused by *Trichophyton quinckeanum*: Male mice (strain $CF_1$-SPF) of 20–22 g. weight are infected on their shaven backs with spore suspension of *Trichophyton quinckeanum*. A typical dermatomycosis with multiple scutula formation develops at the point of infection within 12 days post infectionem.

When infected mice are treated, starting on the day of infection, per os with a throat probe with the preparations mentioned for the Test 2(a) in doses of $2 \times 75$–$2 \times 100$ mg./kg. daily for 8 days, the catching on of the infection and the typical scutula formation can be completely suppressed.

Among the untreated control animals 18 out of 20 animals exhibit scutula formation on the 12th day post infectionem, whereas among the treated animals 1 out of 20 animals exhibits scutula formation on the 12th day of post infectionem.

(c) Experimental trichophytia of guinea pigs caused by *Trichophyton mentagrophytes*: Male guinea pigs of the strain Pearl-bright-white, weight 400–600 g., are infected on their shaven backs with a spore suspension of *Trichophyton mentagrophytes*. The typical dermatomycosis with loss of hair and inflammatory changes of the skin develops at the point of infection within 14 days post infectionem.

When the infected animals are treated, starting on the 4th day post infectionem, with the preparations mentioned for the Test 2(a), as a 1% solution in polyethylene glycol 400, locally once daily by brushing the solutions on to the point of infection, then the dermatomycosis is completely cured by the 12th day post infectionem, whereas it persists with the untreated animals until the 33rd–36th day post infectionem.

The aforesaid preparations have a mean $DL_{50}$ for two animal species of 700–1100 mg./kg. body weight, when administered per os.

The imidazole derivatives and salts of the invention are to be applied in the therapy of dermatomycoses and organomycoses caused by Dermatophytes, mould fungi and gemmiparous fungi, especially species of Trichophyton, Microsporon and Epidermatophyton, Aspergillae, Penicillia and species of Mucor, species of Candida, Histoplasma, Coccidioides, species of Blastomyces, Cryptococcae and Chromomycetes.

Accordingly, the present invention provides a pharmaceutical composition containing as an active ingredient at least one of the new phenyl-imidazolyl-alkanyl derivatives of the General Formula 1 given above, or a non-toxic salt thereof, in admixture with a pharmaceutically acceptable solid or liquid diluent or carrier as hereinafter defined.

In the present specification, the expression "pharmaceutically aceptable diluent or carrier" refers to a non-toxic solid, semi-solid, or liquid substance which when mixed with the active ingredient or ingredients renders it pure suitable for administration. Other pharmaceutically necessary ingredients such as salts in correct quantities to render the composition isotonic, buffers, surfactants, coloring and flavoring agents, and preservatives can also be present. Examples of suitable solid, semi-solid and liquid diluents and carriers include water, non-toxic organic solvents, such as paraffins (e.g. petroleum fractions) vegetable oils (e.g. peanut oil and sesame oil), alcohols (e.g. ethyl alcohol, glycerol), glycols (e.g. propylene glycol, polyethylene glycol); solid carriers such as natural stone meals (e.g. kaolins, aluminas, talc, chalk), synthetic stone meals (e.g. highly disperse silicic acid, silicates), sugars (e.g. raw sugar, lactose and glucose), cellulose and its derivatives. To these may be added emulsifiers such as non-ionic and anionic emulsifiers (e.g. polyoxyethylene-fatty acid esters, polyoxyethylene fatty alcohol ethers, alkylsulfonates and arylsulfonates); dispersing agents (e.g. lignin, sulfite waste liquors, methyl cellulose, starch and polyvinyl-pyrrolidone); and lubricants (e.g. magnesium stearate, talc, stearic acid and sodium lauryl sulfate).

Examples of pharmaceutical compositions according to the invention are ointments, granules, pastes, creams, sprays, lotions, aqueous and non-aqueous suspensions and emulsions, elixirs, syrups, and powders, either free-flowing or compressed into tablets.

The compounds and pharmaceutically acceptable salts of the present invention are preferably administered perorally, but may also be administered parenterally or locally. The compositions administered may contain other active ingredients.

One group of pharmaceutical compositions of the invention are therefore those adapted for oral administration. Examples of diluents and carriers that adapt the active ingredient or ingredients for oral administration are solid vehicles, excipients and lubricants such as glucose, lactose and sucrose, corn and potato starch, sodium carboxymethyl cellulose, ethyl cellulose and cellulose acetate, powdered gum tragacanth, gelatin, alginic acid, agar, stearic acid, sodium, calcium and magnesium stearates, sodium lauryl sulfate, polyvinyl pyrollidone, sodium citrate, calcium carbonate, and dicalcium phosphate, and talc.

The orally administrable pharmaceutical compositions of the invention may also contain other non-toxic adjuvants and modifiers such as dyes, surfactants, perfumes, flavoring agents, preservatives and biocides.

As stated above, the compounds and pharmaceutically acceptable salts of the invention may also be administered parenterally. Examples of diluents and carriers that adapt the active ingredient for parenteral administration are solvents and suspending diluents such as water and water-miscible organic solvents, in particular sesame oil, ground-nut oil, aqueous propylene glycol, and dimethylformamide. Examples of pharmaceutical compositions of the invention are sterile isotonic saline aqueous solutions of the active ingredient, which may be buffered with a pharmaceutically acceptable buffer and are preferably pyrogen-free.

Local application can be carried out using a pharmaceutical composition adapted for such application. Such a pharmaceutical composition can contain, for example, 1% of the active ingredient, in a solvent such as polyethylene glycol 400.

The pharmaceutical compositions of the invention preferably contain 0.5 to 90 wt. percent of a new phenyl imidazolyl-alkenyl derivative of the invention or a non-toxic salt thereof.

In general it has proved expedient to administer amounts of 15 to 75, preferably about 50 mg./kg. body weight, distributed over several applications (e.g. in 3 individual doses), per day, in order to achieve effective results. Nevertheless it may sometimes be necessary to deviate from the above amounts, dependent on the body weight of the subject being treated, the method of application, the species, individual reaction observed and desired, the type of formulation, or the time interval of administration. For example, it is sufficient in some cases to use less than the minimum amount mentioned above, whereas in other cases the aforesaid upper limit should be exceeded. The same range of dosage is envisaged for application in human and veterinary medicine.

The present invention also provides medicaments in dosage unit form as hereinafter defined comprising as an active ingredient at least one phenyl-imidazolyl-alkanyl derivative of General Formula 1 given above or a non-toxic salt thereof, either alone or in admixture with a pharmaceutically acceptable solid or liquid diluent or carrier.

The expression "medicament in dosage unit form" as used in the present specification means a medicament in the form of discrete portions each containing a unit dose or a multiple or sub-multiple of a unit dose of the active ingredient as for example, one, two, three or four unit doses, or a half, a third or a quarter of a unit dose. A "unit dose" is the amount of the active ingredient administered on one occasion and will usually be a daily dose, or a fraction thereof as for example a half, a third, or a quarter of a daily dose depending on the number of times the medicament is administered according to the daily regimen.

The discrete portions constituting the medicament in dosage unit form can include a protective envelope. The active ingredient can be in undiluted form in such an envelope, or can be mixed with a pharmaceutically acceptable solid or liquid diluent or carrier as defined above. Such portions can for example be in monolithic coherent form, such as tablets, lozenges, pills, suppositories, or dragees; in wrapped or concealed form, the active ingredients being within a protective envelope, such as wrapped powders, cachets, sachets, capsules, or ampoules; or in the form of a sterile solution suitable for parenteral injection, such as ampoules of buffered, isotonic, sterile, pyrogen-free aqueous solution; or in any other form known in the art.

As stated above, it is preferred to administer the new phenyl-imidazolyl-alkanyl derivatives of General Formula 1 and their salts perorally. Preferred medicaments in dosage unit form according to the invention are therefore those adapted for oral administration, such as tablets, pills, dragees, capsules, and cachets, as well as wrapped powders containing the active ingredient in powdered form with a powdered diluent or carrier for suspension in water before being taken.

As also stated above it is also possible to administer the new phenyl-imidazolyl-alkenyl derivatives parenterally. Other medicaments in dosage unit form according to the invention are therefore those adapted for parenteral injection, such as ampoules containing a measured quantity of a sterile isotonic saline injectable aqueous solution of the new active ingredient, which may be buffered with a pharmaceutically acceptable buffer and are preferably free of pyrogens.

The preferred unit dose for administration of the medicaments of the invention to a patient of average body weight is from about 4 to about 32 mg./kg. of body weight, preferably about 16 to 20 mg./kg. This will normally be administered three times daily but may be administered more or less frequently as necessary.

The invention further provides a method for combatting fungal, bacterial and protazoal infections in an animal which comprises administering to the animal (preferably parenterally perorally or locally) a pharmaceutical composition according to the invention or a medicament in dosage unit form according to the invention.

What is claimed is:

1. A compound of the formula

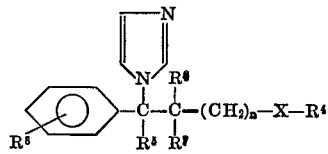

or a pharmaceutically acceptable nontoxic salt thereof, wherein

X is oxygen or imino;

$R^4$ is lower alkanoyl, mono- or di-halo(lower alkanoyl), lower alkylsulfonyl, phenyl(lower alkanoyl), diphenyl (lower alkanoyl), phenyl(lower alkenoyl), naphthoyl, phenylsulfonyl, benzoyl or benzoyl substituted by up to three substituents selected from the group consisting of lower alkyl, lower alkoxy, chloro, bromo, fluoro or nitro;

$R^5$ is lower alkyl or phenyl;

$R^6$ is hydrogen, lower alkyl or phenyl;

$R^7$ is hydrogen or lower alkyl;

$R^8$ is hydrogen; and $n$ is 0 or 1.

2. The compound according to claim 1 which is 1-(1,1-diphenyl-2-acetoxyethyl)imidazole.

3. The compound according to claim 1 which is 1-(1,1-diphenyl-2-propionyloxyethyl)imidazole.

4. The compound according to claim 1 which is 1-(1,1-diphenyl-2-pivalyloxyethyl)imidazole.

5. The compound according to claim 1 which is 1-(1,1-diphenyl-2-dichloroacetoxyethyl)imidazole.

6. The compound according to claim 1 which is 1-(1,1-diphenyl-2-benzoyloxyethyl)imidazole.

7. The compound according to claim 1 which is 1-[1,1-diphenyl-2-(4-chlorobenzoyloxy)ethyl]imidazole.

8. The compound according to claim 1 which is 1-[1,1-diphenyl-2-(2-chlorobenzoyloxy)ethyl]imidazole.

9. The compound according to claim 1 which is 1-[1,1-diphenyl - 2 - (3,4-dichlorobenzoyloxy)ethyl]imidazole.

10. The compound according to claim 1 which is 1-[1,1-diphenyl - 2 - (2,6-dichlorobenzoyloxy)ethyl]imidazole.

11. The compound according to claim 1 which is 1-[1,1-diphenyl - 2 - (2,3,4-trichlorobenzoyloxyethyl]imidazole.

12. The compound according to claim 1 which is 1-[1,1-diphenyl-2-(4-fluorobenzoyloxy)ethyl]imidazole.

13. The compound according to claim 1 which is 1-[1,1-diphenyl-2-(4-bromobenzoyloxy)ethyl]imidazole.

14. The compound according to claim 1 which is 1-[1,1-diphenyl-2-(4-nitrobenzoyloxy)ethyl]imidazole.

15. The compound according to claim 1 which is 1-[1,1-diphenyl-2-(3,5-dinitrobenzoyloxy)ethyl]imidazole.

16. The compound according to claim 1 which is 1-[1,1-diphenyl - 2 - (3-nitro-4-methoxybenzoyloxy)ethyl] imidazole.

17. The compound according to claim 1 which is [1,1-diphenyl-2-(4-methylbenzoyloxy)ethyl]imidazole.

18. The compound according to claim 1 which is 1-[1,1-diphenyl-2-(4-methoxybenzoyl)ethyl]imidazole.

19. The compound according to claim 1 which is 1-(1,1-diphenyl-2-cinnamoyloxyethyl)imidazole.

20. The compound according to claim 1 which is 1-[1,1-diphenyl-2-(α-naphthoyloxy)ethyl]imidazole.

21. The compound according to claim 1 which is 1-(1,1-diphenyl-2-diphenylacetoxyethyl)imidazole.

22. The compound according to claim 1 which is 1-[1,1-diphenyl - 2 - (4 - chlorophenylsulfonyloxy)ethyl]imidazole.

23. The compound according to claim 1 which is 1-(1,1-diphenyl-2-methylsulfonyloxyethyl)imidazole.

24. The compound according to claim 1 which is 1-(1,1-diphenyl-3-acetoxypropyl)imidazole.

25. The compound according to claim 1 which is 1-(2-phenyl-3,3-dimethyl-1-acetoxybut-2-yl)imidazole.

26. The compound according to claim 1 which is 1-(2-phenyl - 3,3 - dimethyl-1-propionyloxybut-2-yl)imidazole.

27. The compound according to claim 1 which is 1-(3-phenyl-4-methyl-1-acetoxpent-3-yl)imidazole.

28. The compound according to claim 1 which is 1-(1,1-diphenyl-2-acetamidoethyl)imidazole.

29. The compound according to claim 1 which is 1-(1,1-diphenyl - 2,2 - dimethyl-3-acetamidopropyl)imidazole.

30. A salt according to claim 1 selected from the group consisting of the hydrochloride, hydrobromide, phosphate, acetate, maleate, succinate, fumarate, tartrate, citrate, salicylate, sorbate, lactate and 1,5-naphthalenedisulfonate.

31. A compound of the formula

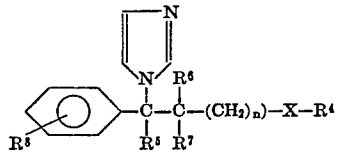

or a pharmaceutically acceptable nontoxic salt thereof, wherein X is oxygen; $R^4$ is lower alkanoyl, mono- or dihalo(lower alkanoyl), lower alkylsulfonyl, phenyl(lower alkenoyl), diphenyl(lower alkanoyl), naphthoyl, chlorophenylsulfonyl, benzoyl or benzoyl substituted by up to three substituents selected from the group consisting of lower alkyl, lower alkoxy, chloro, bromo, fluoro or nitro; $R^5$ is phenyl; $R^6$ and $R^7$ are hydrogen; $R^8$ is hydrogen; and $n$ is 0.

32. A compound of the formula

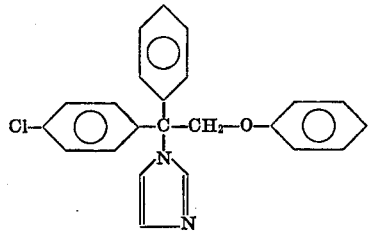

References Cited

Godefroi et al.: J. Med. Chem., vol. 12, pp. 784–91 (1969).

NATALIE TROUSOF, Primary Examiner

U.S. Cl. X.R.

260—309, 455 C, 469, 476 R, 551 R, 556 A, 556 AR, 558 R, 562 R, 562 B, 609 F, 611 A; 424—273